United States Patent
Upstill et al.

(10) Patent No.: US 8,688,715 B1
(45) Date of Patent: Apr. 1, 2014

(54) RESOURCE IDENTIFICATION FROM ORGANIC AND STRUCTURED CONTENT

(75) Inventors: Trystan G. Upstill, Palo Alto, CA (US); Abhishek Das, San Francisco, CA (US); Srinivasan Venkatachary, Sunnyvale, CA (US); Shravya R. Shetty, Mountain View, CA (US); Bin Liu, Sunnyvale, CA (US); Jack W. Menzel, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/491,092

(22) Filed: Jun. 7, 2012

(51) Int. Cl.
*G06F 17/30* (2006.01)

(52) U.S. Cl.
USPC .......................... 707/748; 707/754; 707/769

(58) Field of Classification Search
USPC ........... 707/705, 736, 748, 999.003, 999.004, 707/999.005, 999.006, 999.007, E17.014, 707/754, 769
See application file for complete search history.

(56) References Cited

U.S. PATENT DOCUMENTS

| | | | |
|---|---|---|---|
| 6,804,662 B1 * | 10/2004 | Annau et al. .......................... 1/1 |
| 7,096,214 B1 * | 8/2006 | Bharat et al. .................. 707/708 |
| 7,739,258 B1 | 6/2010 | Halevy et al. |
| 8,037,068 B2 | 10/2011 | Halevy et al. |
| 2003/0088553 A1 * | 5/2003 | Monteverde ...................... 707/3 |
| 2003/0177111 A1 * | 9/2003 | Egendorf et al. ................ 707/3 |
| 2003/0212737 A1 | 11/2003 | Moricz et al. |
| 2005/0120292 A1 | 6/2005 | Suzuki |
| 2007/0055745 A1 * | 3/2007 | Moricz ......................... 709/217 |
| 2007/0078815 A1 | 4/2007 | Weng et al. |
| 2008/0109434 A1 | 5/2008 | Stephens |
| 2009/0198594 A1 * | 8/2009 | Lu et al. .......................... 705/27 |
| 2009/0248619 A1 * | 10/2009 | Das et al. .......................... 707/2 |
| 2010/0169301 A1 * | 7/2010 | Rubanovich et al. ......... 707/709 |
| 2011/0082872 A1 | 4/2011 | Loftus et al. |

* cited by examiner

*Primary Examiner* — Shiow-Jy Fan
(74) *Attorney, Agent, or Firm* — Fish & Richardson P.C.

(57) ABSTRACT

A method includes receiving a query that that is unstructured for a plurality databases; receiving data identifying resources that are determined to be responsive to the query, each resource associated with a search score that defines a respective position of the resource in an order of responsiveness to the query; determining, a service requirement from the terms of the query; determining, for each of the databases, a service requirement score for the database; for each resource that is associated with one of the databases, adjusting the search score based on the service requirement score for the database; generating search results, each search result identify a corresponding resource that was determined to be responsive to the query, and the search results being ordered according to the respective search scores and adjusted search scores of the resources.

6 Claims, 8 Drawing Sheets

RESOURCE IDENTIFICATION FROM ORGANIC AND STRUCTURED CONTENT

CROSS-REFERENCE TO RELATED APPLICATIONS

This application is a continuation application of and claims priority to U.S. application Ser. No. 13/427,329 filed on Mar. 22, 2012, the entire disclosure of which is incorporated herein by reference.

BACKGROUND

This specification relates to digital information retrieval, and particularly to search processing.

The Internet enables access to a wide variety of resources, such as video or audio files, web pages for particular subjects, book articles, or news articles. A search engine can identify resources in response to a user query that includes one or more search terms or phrases. The search engine ranks the resources based on their relevance to the query and importance and provides search results that link to the identified resources, and orders the search results according to the rank.

Many websites for which data available in resources store the data in large databases of structured information. For example, job search websites may have respective job databases, and respective resources (web pages) that include forms to search the databases. Likewise, recipe websites have respective databases for recipes, and movie websites have respective databases for movies. Requesting information for a certain recipe or movie causes the website to query its respective database and generate a webpage that presents the information in a structured format.

Often, however, search engines do not account for particular database search capabilities when ranking resources in response to particular queries. Thus, a website may have particular pages for particular entries in the database so that each page can be crawled and searched by the search engine. For example, an airline flight website may have pre-generated pages for a variety of very popular and well-traveled routes (e.g., New York to San Francisco, Chicago to Los Angeles, etc.). However, this practice tends to artificially increase recall and reduce precision. Furthermore, the underlying search capabilities of the database may prove to be very useful in satisfying a user's informational need. However, many scoring algorithms do not score the search capabilities of a database when determining the relevance of a resource generated from data stored in the database. As a result, the search engine may not identify data that are particularly relevant to a query, and/or identify particular search capabilities that are available to the user that issued the query and that may help the user satisfy his or her informational need.

SUMMARY

In general, one aspect of the subject matter described in this specification can be embodied in methods that include the actions of receiving, from a computer device, a query that includes terms and that is in a format that is unstructured for a plurality of databases; receiving data identifying resources that are determined to be responsive to the query; determining, by a data processing apparatus, a service requirement from the terms of the query, the service requirement being one of a plurality of service requirements fulfilled by the databases; determining, for each of the databases, a service requirement score for the database, the service requirement score being a measure of an ability of the database to fulfill the service requirement; selecting a proper subset of the databases based on the service requirement scores; generating data responsive to the service requirement based on the terms of the query and one or more of databases in the proper subset of databases; generating, from the data identifying resources that are determined to be responsive to the query and from the data responsive to the service requirement, search results that include first search results that each identify a corresponding resource that was determined to be responsive to the query; and providing the search results to the computer device in response to the query. Other embodiments of this aspect include corresponding systems, apparatus, and computer program products.

Another aspect of the subject matter described in this specification can be embodied in methods that include the actions of receiving, from a computer device, a query that includes terms and that is in a format that is unstructured for a plurality databases; determining, by a data processing apparatus, a service requirement from the terms of the query, the service requirement being one of a plurality of service requirements fulfilled by the databases; determining, for each of the databases, a service requirement score for the database, the service requirement score being a measure of an ability of the database to fulfill the service requirement; selecting one of the databases based on the service requirement scores; determining, from the query, parameter values for the service requirement; providing the parameter values to a search interface for a search operation for the selected database and receiving database search results responsive to the parameter values and the search operation; determining, from the database search results, a search constraint for the search query; revising the search query to include the constraint and providing the revised search query to a search engine; and providing search results to the computer device, the search results identifying resources that the search engine determined to be responsive to the revised query. Other embodiments of this aspect include corresponding systems, apparatus, and computer program products.

Another aspect of the subject matter described in this specification can be embodied in methods that include the actions of receiving, from a computer device, a query that includes terms and that is in a format that is unstructured for a plurality databases; receiving data identifying resources that are determined to be responsive to the query, each resource being associated with a search score that defines a respective position of the resource in an order of responsiveness to the query; determining, by a data processing apparatus, a service requirement from the terms of the query, the service requirement being one of a plurality of service requirements fulfilled by the databases; determining, for each of the databases, a service requirement score for the database, the service requirement score being a measure of an ability of the database to fulfill the service requirement; for each resource that is associated with one of the databases, adjusting the search score based on the service requirement score for the database; generating search results, each search result identify a corresponding resource that was determined to be responsive to the query, and the search results being ordered according to the respective search scores and adjusted search scores of the resources; and providing the search results to the computer device according to the order in response to the query. Other embodiments of this aspect include corresponding systems, apparatus, and computer program products.

Particular embodiments of the subject matter described in this specification can be implemented to realize one or more of the following advantages. Websites need not generate multiple "optimized webpages" that are optimized for particular instances of queries to ensure that the website is identified in a search result. Instead, the underlying capabilities of the website database and the authority of the website are used as metrics to surface websites and databases that are of high quality with respect to a particular query. This reduces the overall cost of website management, and provides users with data that are more likely to satisfy the user's informational need than the optimized webpages.

Additionally, the systems and methods can utilize the conceptual schemas of the databases to provide additional information for queries that may not otherwise be derived from the queries. For example, a user that types in the search query [Brand X cameras under 300] may be searching for Brand X cameras that cost less than $300. The user, however, may not know that the "Q" models of Brand X cameras are prosumer models that each retail in excess of $300. Thus, by use of a product database, the search engine may determine that "Q" model are each in excess of $300. Thus, the search engine may modify the query with an operator that excludes the "Q" models, e.g., [Brand X cameras under 3000P:NOT(Q)], or, alternatively, modify the query to emphasize resources that include reference to Brand X models that are priced under $300. The search engine thus surfaces fewer resources that include extraneous information, thereby satisfying the user's informational need more quickly than if the extraneous information were provided.

The advantages and features listed in the above list are optional and not exhaustive. The advantages and features can be separately realized or realized in various combinations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

A search system accesses data describing the capabilities and content of website databases and performs search operations to identify and/or rank resources in response to a search query. In some implementations, the search engine ranks results using a first ranking algorithm and based on non-semantic search terms, e.g., [nursing jobs]. The search system then accesses database information that describes the content and capabilities of website databases to determine which of the databases can fulfill a database service requirement. For example, if the query is [nursing jobs in Palo Alto over 100,000], the search system will identify jobs databases that have geographic and salary parameters that includes the values of "Palo Alto" and "100,000" or more. Using this information, the search engine may promote (or demote) search results referencing resources of a website that includes a database, and/or revise the query to include a constraint to filter out (or emphasize) resources that include certain terms.

Additionally, in some implementations, the search engine may generate additional search results that include links to a database interface through which a user may query the database. In variations of this implementation, the search engine may form a structured query for the database and generate a search result, the selection of which submits the query to the database (e.g., the search result may include a URL to the database with query parameter values).

Additional features and implementations are described in detail in the sections that follow.

Example Operating Environment

Figure 1:
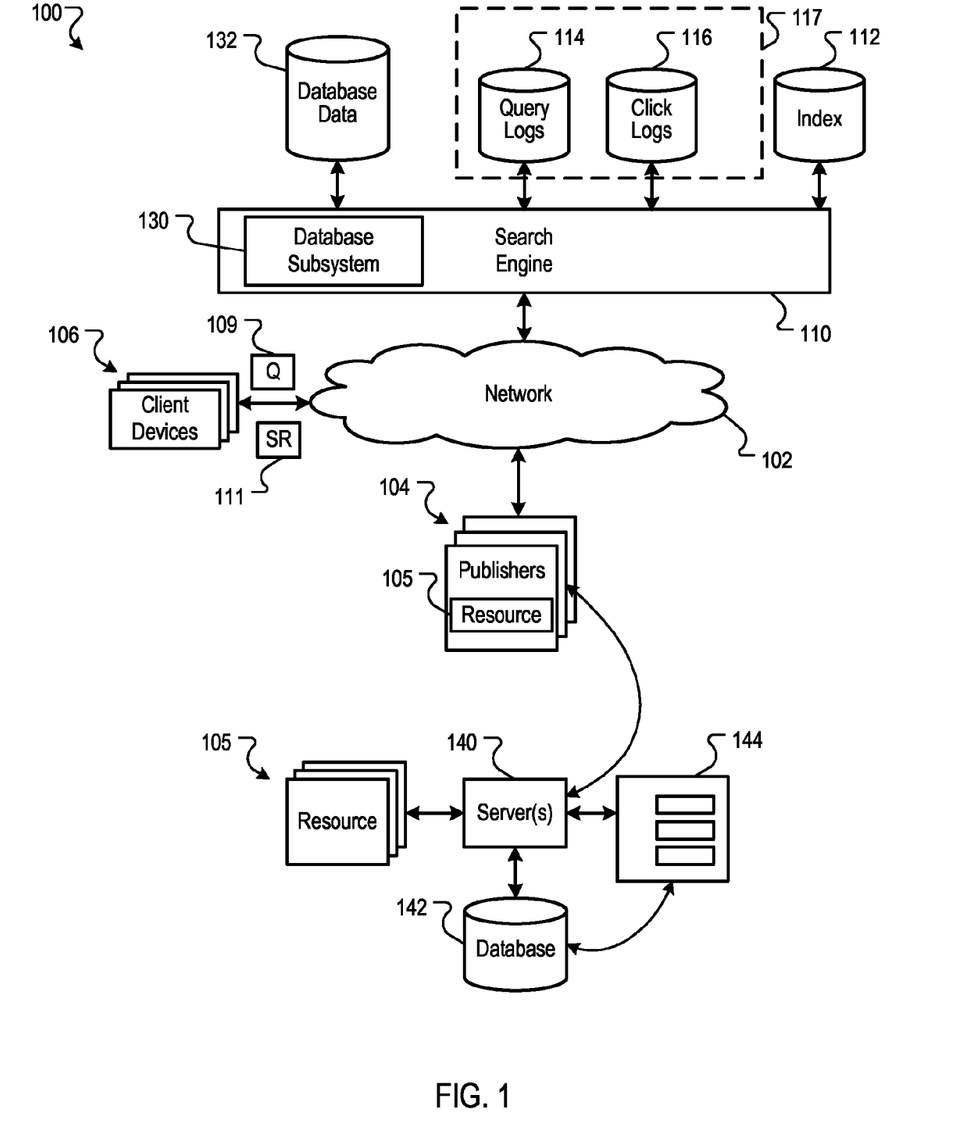
FIG. 1 is a block diagram of an example environment in which a search engine provides search services.

FIG. 1 is a block diagram of an example environment 100 in which a search engine 110 provides search services. A computer network 102, such as a local area network (LAN), wide area network (WAN), the Internet, or a combination thereof, connects publishers 104, user devices 106, and the search engine 110. The online environment 100 may include many thousands of publishers 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource is any data that can be provided by the publisher 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts). The resources 105 can be stored in a memory subsystem, or alternatively can be generated dynamically in response to a request.

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102. By use of these applications, a user device 106 can request resources 105 from a website 104. In turn, the resource 105 can be provided to the user device 106 for presentation by the user device 106.

Some of the websites 104 include one or more databases and provide information stored in the databases to users. For example, one of the websites 104 includes one or more servers 140 that are in data communication with a database 142. The website may provide access to resource that includes an interface 144, such as an on-line form or other interface that allows a user to input data for a database query. The interface 144 may allow the user to explicitly query the database, e.g., allow the user to generate a structured query input, or, alternatively, may allow the user to input parameter values, e.g., such as the name of an actress to search a movie database, and the server generates the query to query the database 142. In response to the query, the server generates a resource 105 that includes the information the database 142 returns.

To facilitate searching of these resources, the search engine 110 identifies the resources by crawling the publishers 104 and indexing the resources 105 provided by the publishers 104. The indexed and, optionally, cached copies of the resources are stored in an index 112.

The user devices 106 submit search queries 109 to the search engine 110. Additionally, other computer devices may submit search queries 109 to the search engine, such as a server computer implementing a service for a website that has partnered with the provider of the search engine 110. For brevity, however, the examples are described in the context of a user device 106.

In response to the search queries, the search engine 110 uses the indexed cache 112 to identify resources that are relevant to the queries. The search engine 110 identifies the resources in the form of search results 111 and returns the search results 111 to the user devices 106 in search results pages. A search result 111 is data generated by the search engine 110 that identifies a resource that satisfies a particular search query, and includes a resource locator for the resource. An example search result 111 can include a web page title, a snippet of text extracted from the web page, and the URL of the web page.

The search results are ranked based on scores related to the resources identified by the search results, such as information retrieval ("IR") scores, and optionally a separate authority ranking of each resource relative to other resources. The scores for each resource are combined to form a search score, and the search results 111 are ordered according to these search scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher 104 hosting the resource receives the request for the resource from the user device 106 and provides the resource to the requesting user device 106.

Resource Identification And Ranking

As described above, resources 105 are ranked on their "organic" content, i.e., the content of the resource, the authority of the resource relative to other resources, etc. However, in some situations information related to a database associated with the resource, or information collected from a database in response to a query, can be used to adjust the search scores of the search results, to revise a query and thereby modify a search, and/or provide additional search results that link to particular databases. Each of these adjustments can be separately implemented in a search engine or implemented in combination in the search engine.

In some implementation, the search engine 110 includes a database subsystem 130. The database subsystem 130 maintains database data 132. The database data 132 includes data describing databases that are provided by websites 104. The database data 132 describes, for each of the databases, one or more service requirements fulfilled by the database and parameter types associated with the service requirement. As used herein, a "service requirement" is a service that is requested, either implicitly or explicitly, by a query. For example, for the query [nursing jobs in Palo Alto over 100, 000], the service requirement is a job search. Likewise, for the query [LAX to SFO] (or [Flights LAX to SFO]), the service requirement is a flight search.

The parameter types are the types of parameters that the database receives as input and the parameters output by a search operation in response to a query input. For example, a flight search database may be configured to receive parameter values for the following parameter types: origin location, destination location, times and dates. Likewise, a job search database may be configured to receive parameter values for the following parameter types: location, job category, and salary.

In some implementations, the database data 132 may also include the parameter values for each database that is described in the database data 132. For example, a particular job database may be tailored to only nursing jobs in New York and thus, the parameter value from the parameter type "Nursing Category" may be limited to specific nursing categories, e.g., Cardiology, Cardiothoracic, Hemodialysis, etc.

The database subsystem 130 can, in some implementations, receive the data that describes the databases from data feeds from the websites 104. For example, the websites 104 may provide data describing the conceptual schema and structure to the database subsystem 130 according to a protocol established by system administrators. Alternatively, the databases subsystem 130, in conjunction with the search engine 110, may crawl websites and analyze forms (e.g., interfaces 144) and structured resources 105 (e.g., web pages for actors, movies, directors, etc. at a movie database website) and derive the database information for the particular databases.

In still further implementations, the database data 132 include copies of databases 142, or includes a different database that indexes and manages the same data stored in the databases 142. Again, the information to replicate the databases 142, either identically or functionally, can be provide by means of feeds from the websites 104, by crawling of the websites 104, or by some other communication process by which the data for the databases are either pushed to the database subsystem 130 or pulled from the databases 142.

Using the information in the database data 132, the database subsystem 130 facilitates a variety of search related operations that can be used to identify and rank resources and databases that can help users satisfy their informational needs. Example operations are described in the following sections, with reference to particular flow charts in the figures.

Generating Search Results Using Service Requirement Data

Figure 2A:
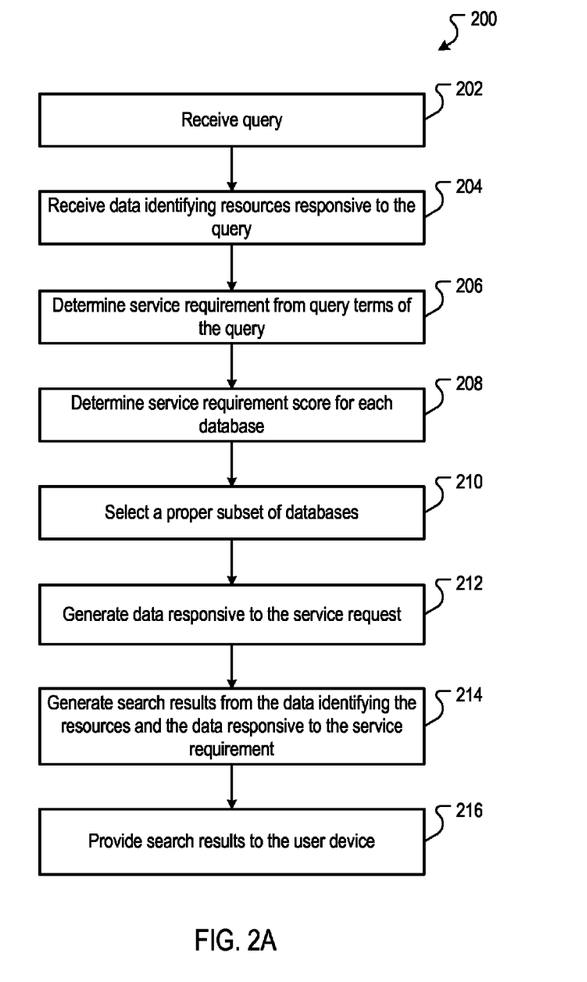
FIG. 2A is a flow diagram of an example process for providing search results that take into account database service requirements derived from the query.

FIG. 2A is a flow diagram of an example process 200 for providing search results that take into account database service requirements derived from the query. The process 200 can be implemented in a data processing apparatus of one or more computers and memory storage systems that are used to implement the search engine 110 and the database subsystem 130.

The database subsystem 130 receives a query (202). The query includes terms and is in a format that is unstructured for the databases. An unstructured query is a text query that is not formatted according to a particular database query language or syntax. For example, a query that conforms to the Structure Query Language (SQL) programming language is a structured query, while a query that is a string of text, such as [nursing jobs in Palo Alto over 100,000] is an unstructured query.

The database subsystem 130 receives data identifying resources responsive to the query (204). Each resource is associated with a search score that defines a respective position of the resource in an order of responsiveness to the query. For example, resources that are determined to be highly responsive to the query have a search score that is higher than the search score of a resource that is determined to be marginally responsive to the query.

The database subsystem 130 determines a service requirement from query terms of the query (206). The service requirement that is determined is one of the service requirements fulfilled by the databases, as specified in the database data 132. For example, for the query [Flights LAX to SFO], the service requirement is a flight search. To determine a service requirement, the database subsystem 130 can, in some implementation, access a set of rules that map query terms to particular service requirements. For example, the terms "flights" "airline flights," etc., may be mapped to a "Flight Search" service requirement.

Similarly, the query terms that specify parameter values for database searches may also be used to determine a service request. For example, the terms "LAX" and "SFO" are airport codes, and the database subsystem 130 can accesses the database data 132 and determine that the airport codes are parameter values for parameter types "Origin" and "Destination" in multiple flight databases. Accordingly, the database subsystem 130 determines the service requirement to be "Flight Search."

Another example process by which a service requirement is determined for a query is described with reference to FIG. 3 below.

Again with reference to FIG. 2, the database subsystem 130 determines a service requirement score for each database (208). The service requirement score is a measure of an ability of the database to fulfill the service requirement. For example, three particular product databases may be determined to fulfill the service request of "Product Price Search" for the query [Brand X cameras under 300]. However, a first one of the databases may not have information related to Brand X cameras (i.e., the database does not include any entries for the manufacturer "Brand X"). Of the remaining two databases, the second database may include only a subset of the entire line of camera offerings by Brand X, while the third database may include a larger set of camera offerings by Brand X. The database subsystem 132 can, in some implementations, use a scoring algorithm that scores a database based on the number of matches of parameter types and parameter values specified by the query, and on the number of parameter values of matching types entered in the database. Based on this scoring algorithm, the third database would be scored higher than the second database, and the second database would be scored higher than the first database.

Other factors can also be used in determining a service requirement score for a database. Another example process by which a service requirement score for a database is determined is described with reference to FIG. 4 below.

Once again with reference to FIG. 2, the database subsystem 130 selects a proper subset of the databases described in the database data 130 (210). The proper subset is based on the service requirement scores. The selection can be based on a maximum number of top-scored databases, or databases having a score that exceeds a threshold, or a combination of both. For example, returning to the "Product Price Search" example, assume the scores for the third, second and first databases are 0.92, 0.61 and 0.12, respectively, and that the maximum selection number is five, and the threshold service requirement score is 0.60. Here, only the third and second databases would be selected, as these are the only two databases with scores exceeding 0.60. Other selection criteria can also be used.

The database subsystem 130 generates data responsive to the service request (212). The data are generated based on the on the terms of the query and one or more of databases in the proper subset of databases. The data that are generated can vary, depending on the type of search results that are generated (214) and provided to the user device (216). Two different example operations are described below.

Figure 2B:
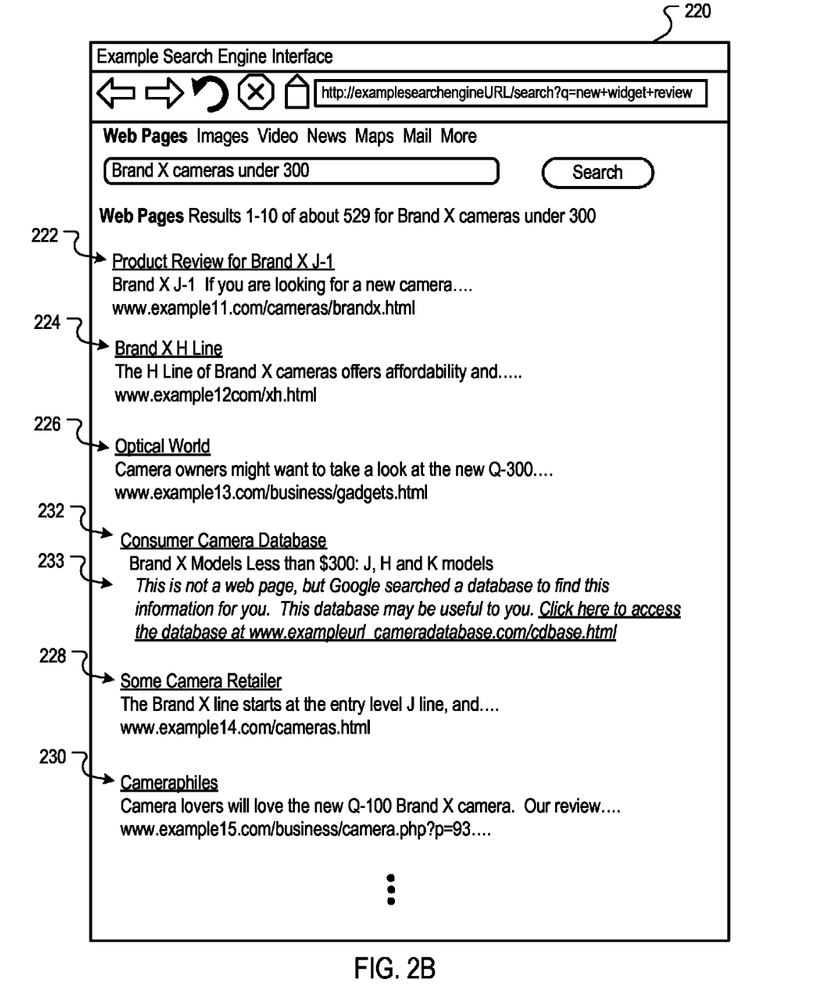
FIGS. 2B-2D are illustrations of example search results pages for a query.

One example operation involves the generation of search results that include first search results that each identify a corresponding resource that was determined to be responsive to the query, and second search results that include the data responsive to the service requirement. The second search result(s) are provided with the first search results, and include text that describing the service requirement determined from the query. For example, FIG. 2B is an illustration of an example search results page for a query [Brand X cameras under 300]. Search results 222, 224, 226, 228 and 230 each reference a resource that the search engine 110 has determined to be responsive to the query. However, the search result 232 includes data responsive to the service requirement. In this case, the data responsive to the service requirement defines a list of Brand X models that are less than $300 (Models J, H and K). Additionally, the search result 232 also includes text 233 that describes that the data is not a web page, but that it was collected from a database search.

The text also includes a hyperlink embedded with a URL to access an interface for the database, e.g., a form page. In some implementations, the database subsystem 130 may prepopulate the URL with query parameters for the particular database. The pre-population is facilitated by the schema and parameter information available in the database data 132. Using this information, the database subsystem 130 formats the embedded URL with the necessary query parameters that cause the website to generate a results page with data returned from the website database 142, e.g.,
www.exampleurl_cameradatabase.com/
cdbase.html?mnfr=X&price_min=0&price_max=300
where mnfr is manufacture parameter, price_min is a minimum price parameter, price_max is a maximum price parameter, and X, 0 and 300 are the respective parameter values.

In this example, the search engine 110 may receive a score for the search result from the database subsystem 130 that results in the search result 232 being positioned at a fixed position, e.g., the fourth position, so as to not displace search results 222, 224 and 226. For example, the database subsystem 130 may select only the top rated database, parse the query using a semantic rule set to determine that parameter value inputs for a database query are "Brand X" and "under 300", and submit the query to the database. In response to receiving the results of the database query, the database subsystem 130 constructs the search result 232 and provides the search result to the search engine 110 for insertion with the search results 222, 224, 226, 228 and 230.

Another example involves determining search constraints for a search query. For example, using a set of semantic rules, the database subsystem 130 parses the query [Brand X cameras under 300] to determine that the query defines a service requirement for a product search (due to the presence of the terms "cameras" and "Brand X"). The particular products to be searched are defined by the parameter values of "cameras", "Brand X" (a known camera brand). Another constraint is the price being "under 300" (the term "under" followed by the value "300" in the product context indicates a price constraint of less than 300 dollars).

The database subsystem 130 thus formulates a query for the camera database for Brand X cameras under $300. The database returns the model parameter values of J, H and K as being true, and the model parameter value of Q being false. In response, the database subsystem 130 determines that "Q" models for Brand X are a search constraint, and modifies the query to include an operator (e.g., "NOT(Q or "Q models") that results in a reduction of a search score for a resource that includes a reference to the "Q" model of Brand X cameras. Alternatively, the databases subsystem can modify the query to include operator that emphasize the J, H and K models, which results in a scoring increase for resources that include references to these models.

Figure 2C:
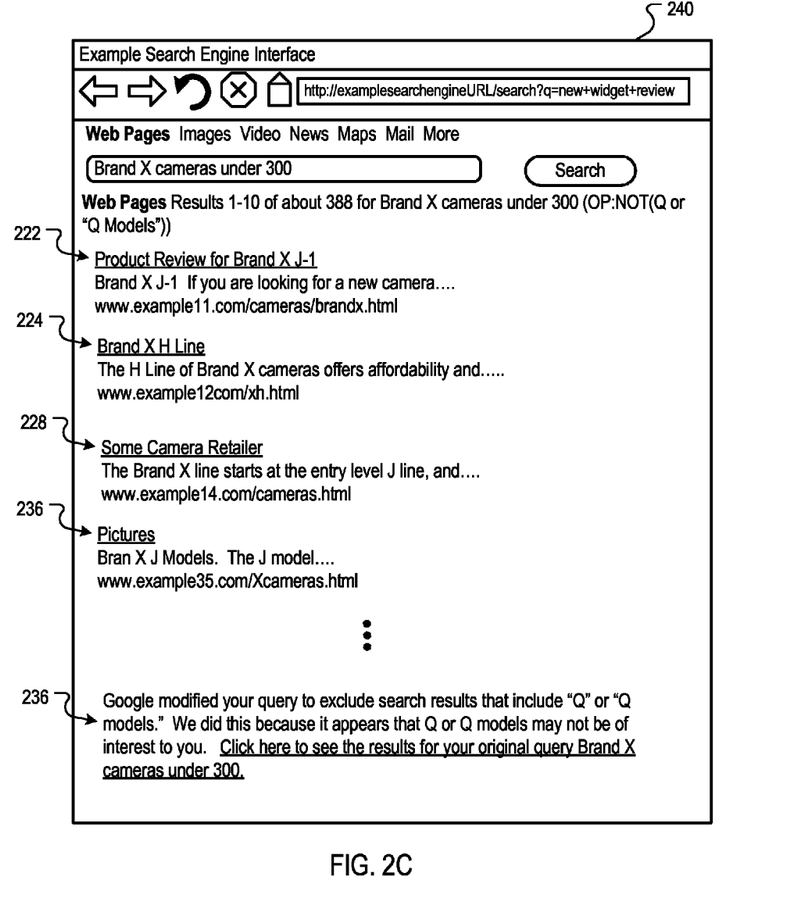

FIG. 2C is an illustration of a search results page 240 displaying search results for the query [Brand X cameras under 300]. While some of the search results are the same as those shown in FIG. 2B for the same query (e.g., search results 222, 224 and 228), some of the search results in FIG. 2B that refer primarily to the Q line of Brand X cameras (i.e., search results 226 and 230) are not displayed among the top-ranked search results in FIG. 2C.

Thus, the search results of FIG. 2B, where were presented in a first order, have been re-ordered according to a second order that is different from the first order. This is because the search query has been modified to include the constraint. As indicated by the message 236 at the bottom of the search results page in FIG. 2C, the database subsystem 130 has modified the query to include the search constraint, which, in turn, results in a re-ordering the resources according to the second order.

Figure 2D:
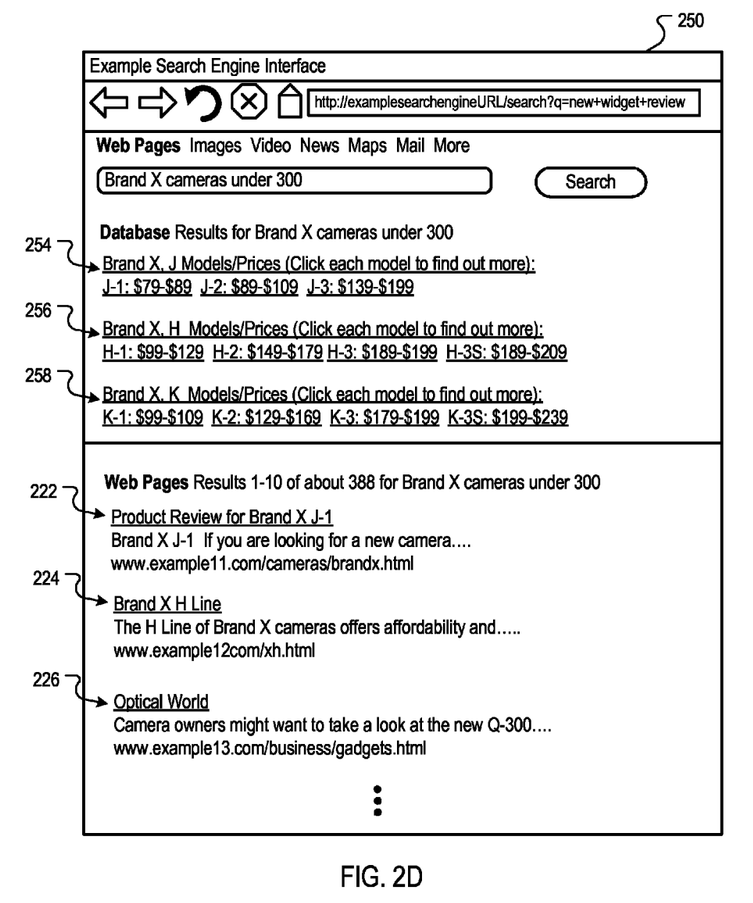

Another example involves providing structured content search results with web search results for a query. FIG. 2D an illustration of a search results page 250 displaying search results 224-226 for the query [Brand X cameras under 300], and structured content search results 252-256. Each structured content search results 252, 254 and 256 provides one or more parameter values for an identified service requirement. In the example shown in FIG. 2D, the parameter values are particular Brand X camera models under $300, and corresponding price ranges. The database subsystem 130 can determine the data for the structured content search results 252, 254 and 256 in a variety of ways. In some implementations, for example, the database data 132 includes replications of various publisher database 142. Using the identified service requirements and parameter values, the database subsystem 130 queries the database data 132 to gather the relevant information for the query. For example, the database subsystem 130 queries the database data 132 with a query, e.g., [Product: Camera; Manufacturer: Brand X; Price Min: 0; Price Max: 300], and receives results that specify the particular H, J and K models, and the offer prices listed in the database.

The offer prices are summarized by ranges and grouped with each particular model. In some implementations, each model listing in each search result is a link, the selection of which causes the database subsystem 130 to generate more detailed results related to the particular model, e.g., vendors and prices, images of the product, etc.

In implementations in which the database data 132 does not include complete replications of various publisher database 142, the database subsystem 130 can query the correspond databases 142. After the results are received (or after a time out period), the received results are aggregated and summarized to generate the structured content search results.

Determining Service Requirements

Figure 3:
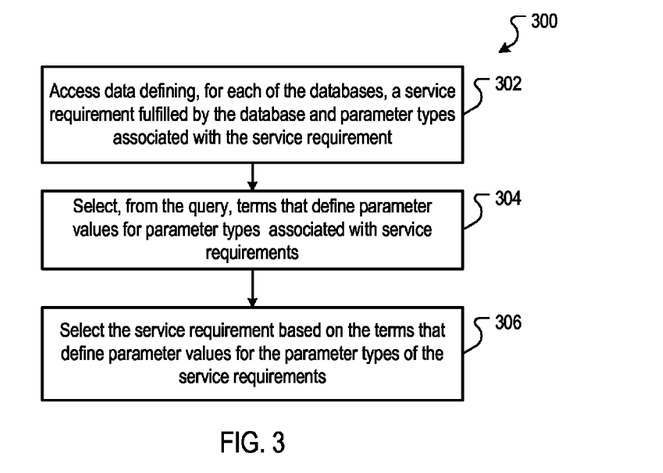
FIG. 3 is a flow diagram of an example process for determining a service requirement for a query.

FIG. 3 is a flow diagram of an example process 300 for determining a service requirement for a query. The process 300 can be implemented in a data processing apparatus of one or more computers and memory storage systems that are used to implement the search engine 110 and the database subsystem 130.

In response to receiving a query, the database subsystem 130 accesses data defining, for each of the databases, a service requirement fulfilled by the database and parameter types associated with the service requirement (302). As described above, the parameter types are the types of parameters that the database receives as input and the parameters output by a search operation in response to a query input. Each parameter type defines a parameter input or parameter output for a search operation that fulfills the service requirement. In particular, a flight search database may be configured to receive parameter values for the following parameter types: origin location, destination location, times and dates. Likewise, a job search database may be configured to receive parameter values for the following parameter types: location, job category, and salary. As described above, this data may be stored in the database data 132, which, in turn may be have been provided by means of a data feed, or derived by a crawls and subsequent analysis.

The database subsystem 130 selects, from the query, terms that define parameter values for parameter types associated with service requirements (304). For example, for the query [Flights LAX to SFO], the terms LAX and SFO correspond to parameter values of origin and destination in a flight database. Thus, the flight database, which fulfills the service requirement of flight searches, is also selected.

By way of another example, suppose the query read [Flights Los Angeles to San Francisco]. While the terms "Los Angeles" and "San Francisco" are also query parameter values for a flight database, these terms are also included in many other databases (e.g., retailer outlet databases, sports databases, etc.). To resolve this ambiguity, the database subsystem 130 also determines that the term "Flights" is a parameter type that is return from a flights database, and that is not included in the retailer outlet or sports databases. Thus, because the flight database has the most matches of the parameter values defined by the terms of the query to the parameter types of the service requirement fulfilled by the database, the flight database is scored higher than the other databases.

The database subsystem 130 then selects the service requirement based on the terms that define parameter values for the parameter types of the service requirements (306). Here, because the flight database has the most matches to the terms and fulfills a service requirement of flight searches, "flight search" is selected as the service request.

Note that more than one service request may be selected. For example, for the query [San Francisco to Los Angeles], several different types of travel databases may be selected, e.g., a flight travel database, a rail travel database, and a bus travel database. Each of these databases may be ranked according to a service requirement score.

Figure 4:
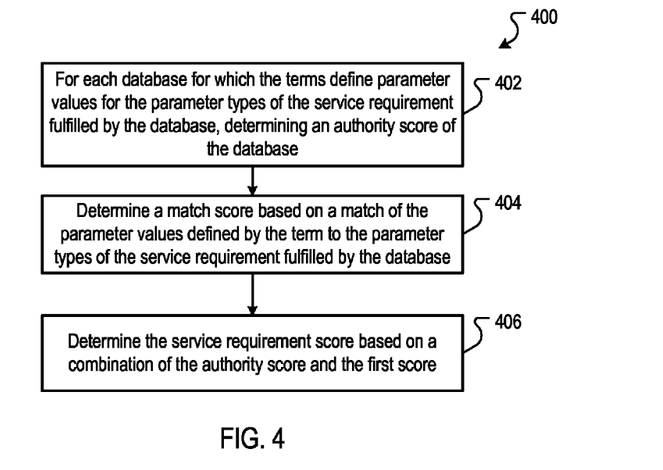
FIG. 4 is a flow diagram of an example process for determining a service requirement score for ranking a database relative to other databases.

FIG. 4 is a flow diagram of an example process 400 for determining a service requirement score for ranking a database relative to other databases. The process 400 can be implemented in a data processing apparatus of one or more computers and memory storage systems that are used to implement the search engine 110 and the database subsystem 130.

The database subsystem 130 determines an authority score for each database for which the terms define parameter values for the parameter types of the service requirement fulfilled by the database (402). The authority score is a measure of authority of the database relative to other databases. The authority score for a database can be based on multiple factors, such as the number of resources that link to the website the hosts the database, the amount of traffic to the website, and other factors.

In some implementations, the authority score can be used as the service requirement score. However, in other implementations, the authority score can be combined with other scores, such as the match score described above. For example, the database subsystem 130 can determine a match score based on a match of the parameter values defined by the term to the parameter types of the service requirement fulfilled by the database (404). For example, a particular query may specify five parameter types for a service requirement. Three databases may be available to fulfill the service requirement, and of the three databases, one is of a schema that accounts for four of the five parameter types, while the other two are of schemas that account for each of the five parameter types. The database subsystem 130 generates match scores that are reflective of the full and partial matches.

The database subsystem 130 determines the service requirement score based on a combination of the authority score and the match score (406). Here, the partial match score of the first database, when combined with the authority score of the first database, will decrease the authority of the database relative to the other two databases.

Generating Search Results Using Constraints Derived From Databases

In the example implementations described above, the database subsystem 130 is used to modify search results for resources that are scored by the search engine 110 after the search engine processes an original query. In some implementations, the database subsystem 130 first determines whether any constraints can be derived from the query before the search operation is performed.

Figure 5:
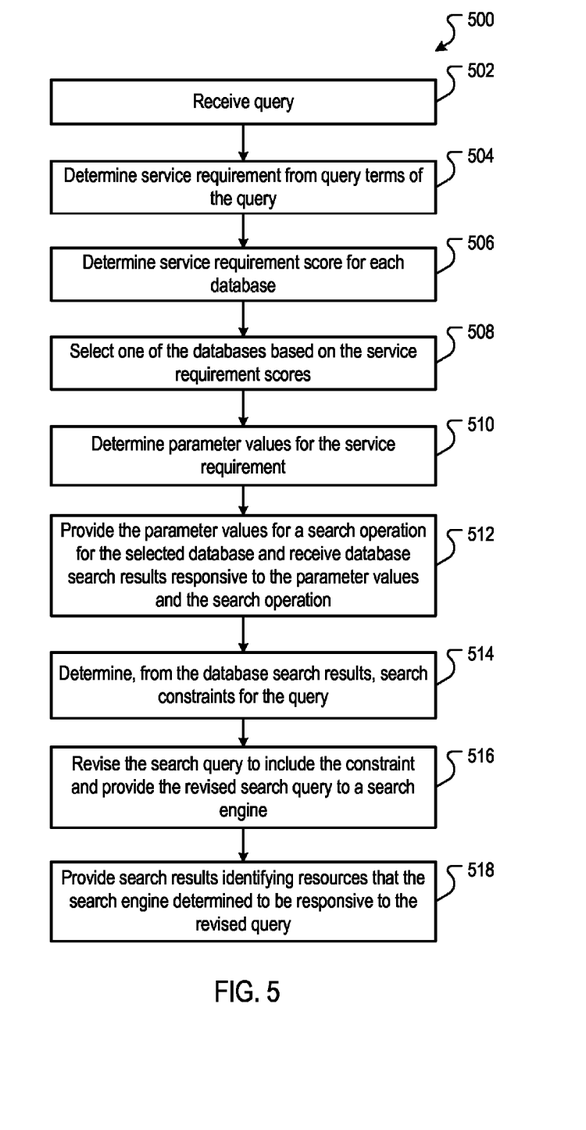
FIG. 5 is a flow diagram of an example process for deriving constraints from database information for a query and revising the query.

FIG. 5 is a flow diagram of an example process 500 for deriving constraints from database information for a query and revising the query. Once revised, the query is then submitted to the search engine 110 for a search operation. The process 500 can be implemented in a data processing apparatus of one or more computers and memory storage systems that are used to implement the search engine 110 and the database subsystem 130.

Process steps 502, 504 and 506 are similar to process steps 202, 206 and 208 of FIG. 2A. However, the database subsystem 130 selects one of the databases based on the service requirement scores (508). For example, the database subsystem 130 selects the highest scored database.

The database subsystem 130 then determines, from the query, parameter values for the service requirement (510). For example, for the query [Brand X cameras under 300], the database subsystem may determine that the parameter values for the parameter type "Manufacturer" is "Brand X"; for the parameter type "Product,", "cameras," and for the parameter type "Price", the value "Less than $300."

The database subsystem 130 provides the parameter values to a search interface for a search operation for the selected database and receives database search results responsive to the parameter values and the search operation (512). For example, the database subsystem 130 may receive data indicating that only the J, H and K product line of cameras are under $300, while the Q line of cameras is over $300.

The database subsystem 130 determines, from the database search results, search constraints for the search query (514). For example, the database subsystem 130 may add a constraint that each resource must include reference to a J, H or K-type camera by Brand X, or, alternatively, must not reference a Q-type camera by Brand X.

The database subsystem 130 revises the search query to include the constraint and provides the revised search query to a search engine (516). For example, the database subsystem 130 may access a rule that that defines query operators for the search engine 110, and may generate constraints using the query operators.

The search system 110 then processes the query and provides search results to the user device (518). The search results identify resources that the search engine 110 determined to be responsive to the revised query. The resulting search results page that is generated may, for example, be similar to the search results page shown in FIG. 2C.

Generating Search Results Using Database Scores

In another implementation, the database subsystem 130 is used to adjust the order of search results based on the resources being associated with databases. For example, there may be numerous resources related to the camera query [Brand X cameras under 300]. Several of these resources, however, may include links to a consumer product database that a user can search. This link to the database, however, may have little, if any, affect on the search engine's 110 determination of relevance of the resource to the query. However, given that access to the database may help satisfy the user's informational need, the database subsystem 130 can adjust the search score of the resource to reflect that the resource provides access to a potentially useful tool to the user.

However, for this to occur, the database must be relevant to the query. Thus, the service requirement score is again used to score and rank the databases. For example, a sports related web site may have an article on sports photography on a budget, and may describe that the images were taken by a K-type Brand X camera, which is an entry-level digital camera. The resource in which the article is published may also have widget that displays current sports scores, and a link to a sport-related statistical database. While the resource may be relevant to the query [Brand X cameras under 300], the search score of the resource will not be adjusted by the resource's association with the sports database, as the sports database has a very low, if not minimum, service requirement score for the query. In particular, the sports databases cannot fulfill the service requirement of a product search.

Figure 6:
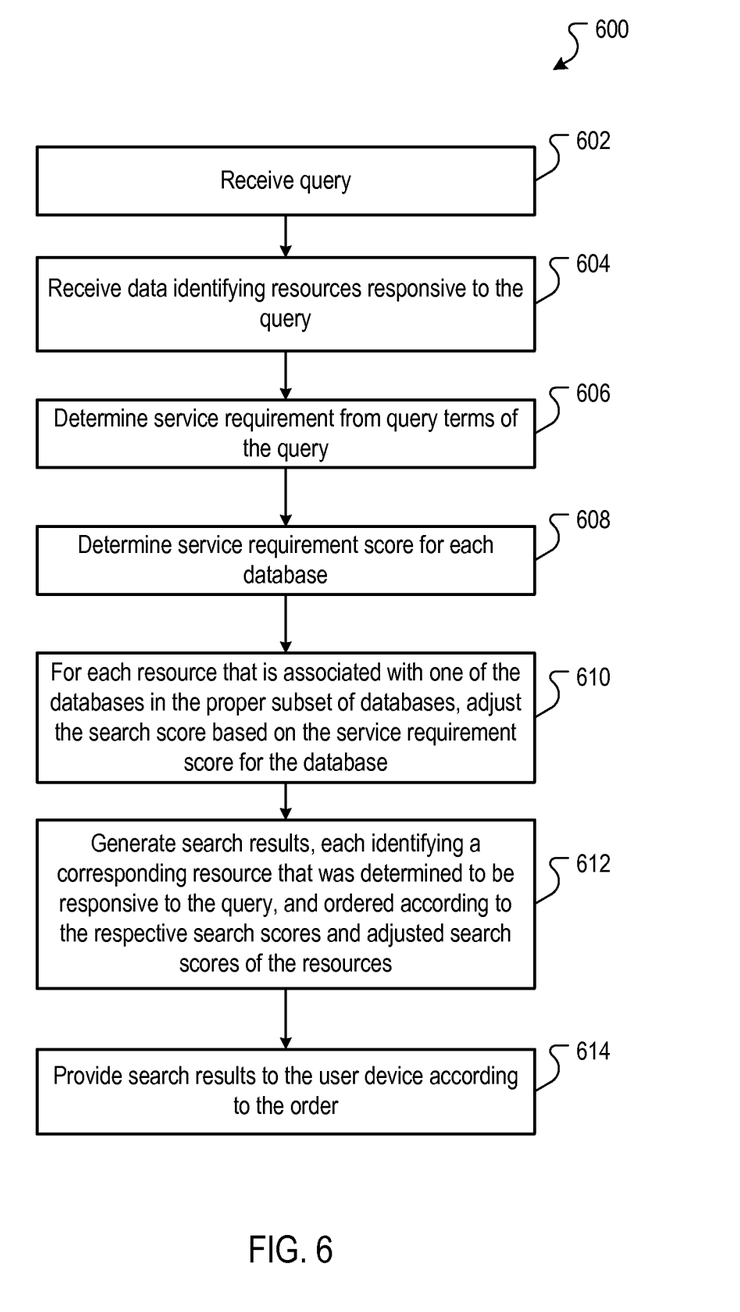
FIG. 6 is a flow diagram of an example process for ranking search results, in part, based on service requirement scores of associated databases.

FIG. 6 is a flow diagram of an example process 600 for ranking search results, in part, based on service requirement scores of associated databases. The process 600 can be implemented in a data processing apparatus of one or more computers and memory storage systems that are used to implement the search engine 110 and the database subsystem 130.

Process steps 602, 604, 606 and 608 are similar to process steps 202, 204, 206 and 208 of FIG. 2A. However, the database subsystem 130 adjusts the search score of each resource based on the service requirement score for the database that is associated that resource (610). For example, if the service requirement score ranges from 0.0 to 1.0, where 0.0 being indicative of a database not having any ability to fulfill a service requirement specified by a query, and 1.0 being indicative of a database having a very high ability to fulfill a service requirement specified by the query, the adjustment of the search score may be $$SS'=SS*(1.0+SRS*C)$$

where:
SS is the original search score;
SS' is the adjusted search score;
SRS is the service requirement score; and C is a scaling constant set by system administrators.

The scoring adjustment formula above is an example, and other scoring adjustment formulas can be used.

Using the search scores and adjusted search scores, the search engine 110 generates search results (612). Each search result identifies a corresponding resource that was determined to be responsive to the query, and the search results are ordered according to the respective search scores and adjusted search scores of the resources.

The search engine 110 then provides the search results to the user device according to the order in response to the query (614).

Parameter Value Modification

In a variation of the implementations described above, search results are generated using only non-parameter values of the query (or derived from the query if the query consists entirely of parameter values). For example, for the query [Flights LAX to SFO], the terms "LAX" and "SFO" are determined to be parameter values. Thus, the database subsystem 130 informs the search engine that the resources should be scored only on the term "Flights." The search results are then adjusted using, for example, the constraints or database scores described above.

If the query consists entirely of parameter values, e.g., [LAX to SFO], then the query may be modified to include a term that is derived from the identified service requirements, e.g., [flights] or [airline travel]. The database subsystem 130 informs the search engine that the resources should be scored only on the modified query, and the search results are then adjusted using, for example, the constraints or database scores described above.

Excluding initial scoring based on parameter values reduces the scores of resources that are pre-generated and optimized for particular queries. The underlying rationale for this modification is that uses are more interested in accesses a website that can provide tailored search capabilities (e.g., a flights database interface) so that the user can explore additional options, and are less interested in pre-generated resources that may not fully satisfy the user's informational need.

To implement this feature, the database subsystem 130 again accesses the database data 132 to determine which terms in the query specify particular parameter values, which terms specify only a parameter type, and which terms specify neither parameter values nor flights. In some implementations, parameter values are excluded from the query, and the query is processed without the parameter value terms. In another implementation, the parameter values are replaced with parameter types (e.g., the [Flights LAX to SFO] is modified to [Flights Origin to Destination]). In yet another implementation, a description of the service request is included in the query (e.g., the query [LAX to SFO] is modified to [Flight Search]).

The user may have the option to submit the original query, e.g., such as by means of a textual description of the modification and a link to submit the original query, similar to the message 236 shown in FIG. 2C.

Additional Implementation Details

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer-implemented method, comprising:
   receiving, from a computer device, a query that includes terms and that is in a format that is unstructured for a plurality of databases;
   receiving data identifying resources that are determined to be responsive to the query, each resource being associated with a search score that defines a respective position of the resource in an order of responsiveness to the query;
   determining, by a data processing apparatus, a selected service requirement from the terms of the query, the selected service requirement being selected from a plurality of service requirements fulfilled by the databases, the determining the selected service requirement from the terms of the query comprising:
      accessing data defining, for each of the databases, a service requirement fulfilled by the database and parameter types associated with the service requirement, each parameter type defining a parameter input type or parameter output type that the database receives as input or provide as output, respectively, for a search operation particular to the database that fulfills the service requirement;
      selecting, from the query, terms that define parameter values for parameter types associated with service requirements; and
      selecting the service requirement based on the terms that define parameter values for the parameter types of the service requirements;
   determining, for each of the databases, a service requirement score for the database, the service requirement score being a measure of an ability of the database to fulfill the selected service requirement, the determining comprising determining a first score based on matches of the parameter values defined by the terms to the parameter types of the service requirement fulfilled by the database and a quantity of parameter values of the matching parameter types in the database;
   for each resource that is associated with one of the databases, adjusting the search score based on the service requirement score for the database;
   generating search results, each search result identify a corresponding resource that was determined to be responsive to the query, and the search results being ordered according to the respective search scores and adjusted search scores of the resources; and
   providing the search results to the computer device according to the order in response to the query.

2. The computer-implemented method of claim 1, wherein determining the service requirement score for each of the databases comprises:
   for each of the databases for which the terms define parameter values for the parameter types of the service requirement fulfilled by the database, determining an authority score of the database, the authority score being a measure of authority of the database relative to other databases; and
   determining the service requirement score based on a combination of the authority score and the first score.

3. A system, comprising:
   a data processing apparatus; and
   a memory apparatus in data communication with the data processing apparatus and storing instructions executable by the data processing apparatus that upon such execution cause the data processing apparatus to perform operations comprising:
   receiving, from a computer device, a query that includes terms and that is in a format that is unstructured for a plurality of databases;
   receiving data identifying resources that are determined to be responsive to the query, each resource being associated with a search score that defines a respective position of the resource in an order of responsiveness to the query;
   determining, by the data processing apparatus, a selected service requirement from the terms of the query, the selected service requirement being selected from a plurality of service requirements fulfilled by the databases, the determining the selected service requirement from the terms of the query comprising:
      accessing data defining, for each of the databases, a service requirement fulfilled by the database and parameter types associated with the service requirement, each parameter type defining a parameter input type or parameter output type that the database receives as input or provide as output, respectively, for a search operation particular to the database that fulfills the service requirement;

selecting, from the query, terms that define parameter values for parameter types associated with service requirements; and selecting the service requirement based on the terms that define parameter values for the parameter types of the service requirements;

determining, for each of the databases, a service requirement score for the database, the service requirement score being a measure of an ability of the database to fulfill the selected service requirement, the determining comprising determining a first score based on matches of the parameter values defined by the terms to the parameter types of the service requirement fulfilled by the database and a quantity of parameter values of the matching parameter types in the database;

for each resource that is associated with one of the databases, adjusting the search score based on the service requirement score for the database;

generating search results, each search result identify a corresponding resource that was determined to be responsive to the query, and the search results being ordered according to the respective search scores and adjusted search scores of the resources; and providing the search results to the computer device according to the order in response to the query.

4. The system of claim 3, wherein determining the service requirement score for each of the databases comprises:

for each of the databases for which the terms define parameter values for the parameter types of the service requirement fulfilled by the database, determining an authority score of the database, the authority score being a measure of authority of the database relative to other databases; and determining the service requirement score based on a combination of the authority score and the first score.

5. A memory apparatus storing instructions executable by a data processing apparatus that upon such execution cause the data processing apparatus to perform operations comprising:

receiving, from a computer device, a query that includes terms and that is in a format that is unstructured for a plurality of databases;

receiving data identifying resources that are determined to be responsive to the query, each resource being associated with a search score that defines a respective position of the resource in an order of responsiveness to the query;

determining, by a data processing apparatus, a selected service requirement from the terms of the query, the selected service requirement being selected from a plurality of service requirements fulfilled by the databases, the determining the selected service requirement from the terms of the query comprising:

accessing data defining, for each of the databases, a service requirement fulfilled by the database and parameter types associated with the service requirement, each parameter type defining a parameter input type or parameter output type that the database receives as input or provide as output, respectively, for a search operation particular to the database that fulfills the service requirement;

selecting, from the query, terms that define parameter values for parameter types associated with service requirements; and selecting the service requirement based on the terms that define parameter values for the parameter types of the service requirements;

determining, for each of the databases, a service requirement score for the database, the service requirement score being a measure of an ability of the database to fulfill the selected service requirement, the determining comprising determining a first score based on matches of the parameter values defined by the terms to the parameter types of the service requirement fulfilled by the database and a quantity of parameter values of the matching parameter types in the database;

for each resource that is associated with one of the databases, adjusting the search score based on the service requirement score for the database;

generating search results, each search result identify a corresponding resource that was determined to be responsive to the query, and the search results being ordered according to the respective search scores and adjusted search scores of the resources; and providing the search results to the computer device according to the order in response to the query.

6. The memory apparatus of claim 5, wherein determining the service requirement score for each of the databases comprises:

for each of the databases for which the terms define parameter values for the parameter types of the service requirement fulfilled by the database, determining an authority score of the database, the authority score being a measure of authority of the database relative to other databases; and determining the service requirement score based on a combination of the authority score and the first score.

* * * * *

UNITED STATES PATENT AND TRADEMARK OFFICE
CERTIFICATE OF CORRECTION

PATENT NO. : 8,688,715 B1  
APPLICATION NO. : 13/491092  
DATED : April 1, 2014  
INVENTOR(S) : Trystan G. Upstill et al.

Page 1 of 1

It is certified that error appears in the above-identified patent and that said Letters Patent is hereby corrected as shown below:

Abstract:
Title Page, Column 2, Line 1 – delete "that that" and insert -- that --, therefor.

Title Page, insert Item (63), Column 1, Line 22 (approx.) – insert -- Related U.S. Application Data Continuation of application no. 13/427,329, filed on Mar. 22, 2012. --, therefor.

Signed and Sealed this
Twenty-second Day of July, 2014

Michelle K. Lee
*Deputy Director of the United States Patent and Trademark Office*